UnitedStates Patent Office 3,334,043
Patented Aug. 1, 1967

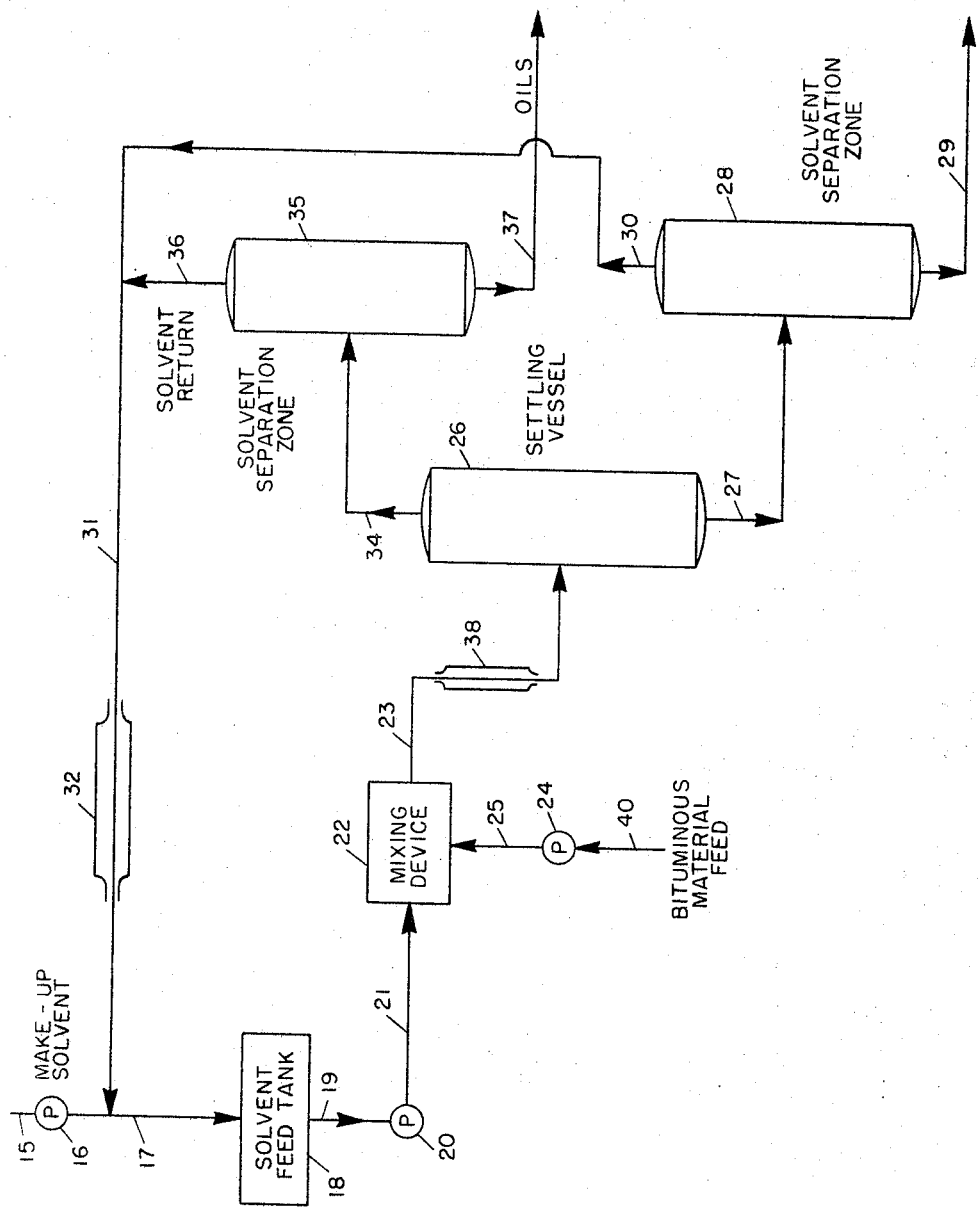

3,334,043
NEOPENTANE SEPARATION OF BITUMINOUS MATERIALS
Seymour W. Ferris, deceased, late of Mount Holly, N.J., by Lucretia G. Ferris, executrix, Mount Holly, N.J., and Ernest P. Black, West Chester, Pa., assignors to Sun Oil Company, Philadelphia, Pa., a corporation of New Jersey
Filed Sept. 29, 1965, Ser. No. 491,458
10 Claims. (Cl. 208—309)

This invention relates to a process for the separation of asphalts and similar bituminous materials into at least two principal fractions and recovery of each of the fractions separately.

This inveniton also relates to a process for recovering a cracking stock or lubricating grade oil from oil-bearing bituminous materials.

This invention particularly relates to a process utilizing neopentane as a solvent medium for separating and recovering the constituents of asphalt and other bituminous materials.

Asphalt and similar bituminous materials are often described as highly complex mixtures of a very large number of compounds covering a wide range of structures and molecular weights. It is customary to characterize their composition by solubility in definite amounts of arbitrarily selected solvents. Thus when, for example, an asphalt sample is thoroughly mixed with normal pentane, isopentane, normal hexane, petroleum ether, and certain other solvents, the undissolved portions settling out are classified ordinarily as asphaltenes and the soluble portion as a mixture of resinous and oily materials. Since the amount of material which settles out varies somewhat with these solvents, the undissolved portion is sometimes more specifically designated as "normal pentane asphaltenes," "isopentane asphaltenes," etc.

As a rule the average molecular weight and structural complexity of the various fractions of bituminous materials increases from the oily to the resinous fraction and finally to the asphaltene fraction. Also these three fractions or categories differ widely in their physical and chemical characteristics.

The principal fractions which normally constitute bituminous materials, namely, asphaltenes, resins, and oil, as well as waxes in some instances, are often individually useful for purposes for which the parent material is not suitable; or when the separated fraction is used for the same purpose as the parent material it often gives results which are new or improved. Thus, for example, when the parent material is steam or vacuum reduced asphalt, the oils can be utilized as a cracking stock and also have lubricating properties. The resins are useful in coating compositions and as extenders in plastics manufacture and asphaltenes are useful as rubber extenders and in coating compositions. The oils are often considered to be most valuable constituents of the bituminous materials because of their value as a cracking stock or uses in lubrication. The resins, oil, and asphaltene constituents of bituminous materials can also be used singly or in combination as additives to modify the properties of asphalt and other similar bituminous material.

Many methods of fractionating bituminous materials have been previously disclosed in the art. For example, low temperature, low pressure extraction of bituminous materials with most low-boiling hydrocarbon solvents results in separation of a soluble fraction from an insoluble fraction. The insoluble fraction is defined as asphaltenes and the soluble fraction is designated as maltenes. The maltene fraction substantially consists of oil and resins. As previously noted, of the three major constituents of bituminous materials, the oil fraction is considered the most valuable due to its application as a lubricating stock or as a cracking stock. Therefore, a further separation of the maltene fraction of previously separated bituminous materials is necessary to recover the valuable oil fraction. The use of adsorption columns as well as various other methods have been shown to accomplish maltene fractionation.

Several well known method of separating asphalt into its various fractions are also disclosed in the patent art. For example, U.S. Patents 2,143,882 and 2,940,920 disclose methods utilizing high temperature-pressure techniques for fractionating bituminous materials, and recovering the valuable oil fraction from those materials.

U.S. Patent 2,783,188 relates to a two-step procedure for fractionating bituminous materials involving the use of adsorption columns. However, the above techniques as well as many other presently known and used methods of recovering oil from oil bearing bituminous materials involve the use of costly processing equipment, extensive processing periods as well as high energy input requirements all of which detract from the commercial aspects of these processes. By the process of the present invention these disadvantages of many of the presently known bituminous material fractionation methods are overcome.

It is an object of this invention to provide a new and improved method of separating asphalt or similar bituminous materials into its major component fractions.

It is also an object of this invention to provide a simple easy process of recovering the maximum yields of high quality substantially asphaltene-free, resin-free, wax-free oil fractions from asphaltic or similar bituminous materials.

A further object of this invention is to provide a method by which a substantially asphaltene-free, resin-free, wax-free oil fraction can be recovered from asphalt or similar bituminous materials by a process conducted at low temperatures and pressures.

It has now been discovered that the foregoing objects can be accomplished by the use of neopentane as the solvent extraction medium. As disclosed above asphalts or similar bituminous residua are normally fractionated by solvent extraction procedures using certain low boiling paraffinic solvents. Normally the separation achieved by the presently known and used solvent mediums results in the precipitation of the asphaltene and wax fractions while the resin and oil fractions remain in the liquid phase thus requiring a second step in order to separate the oil fraction from the resin fraction.

Now it has been discovered that by the use of neopentane (2,2-dimethylpropane) as the solvent medium, solvent fractionation of bituminous materials results in a completely different and unexpected separation. When neopentane is used as the solvent extraction medium in the fractionation of asphaltic or similar bituminous residuum the asphaltene and resin fractions as well as wax fractions when present remain substantially undissolved leaving a substantially asphaltene-free, resin-free, wax-free oil fraction in the liquid phase of the mixture which oil fraction is then easily recovered from the neopentane solvent.

The drawing diagrammatically illustrates one mode of practicing the process of the present invention wherein a high quality oil can be continuously recovered from an oil bearing bituminous material by fracionation with neopentane wherein the neopentane solvent can also be recovered from the separated fractions and recycled. Referring now to the drawing an asphaltic type bituminous material in the form of a hot melt or pulverized particles is fed continuously or batchwise via line 40 into pump 24 and therefrom into mixing device 22 via line 25. Neopentane solvent is fed from solvent feed tank 18 into pump 20 via line 19 and then into mixing device 22 via line 21. The resultant solvent and bituminous material mixture is transferred continuously or as a batch from mixing device 22 into settling vessel 26 through line 23. Line 23 is provided with heat exchange means 38 which provides for temperature control of the feed mixture prior to entering settling vessel 26 which control is particularly useful when high temperature mixing is employed. Upon entering settling vessel 26 the neopentane-bituminous material mixture separates into two phases, the first phase comprising a precipitate of asphaltenes, resins, and waxes and the second phase comprising a supernatant liquid comprising oil and neopentane solvent. The supernatant liquid phase in settling vessel 26 is transferred through line 34 into solvent separation zone 35 wherein neopentane solvent can be distilled or flashed from the mixture leaving high quality substantially asphaltene-free, resin-free, wax-free oil which is withdrawn and recovered from zones 35 via line 37. Neopentane solvent is transferred from zone 35 to solvent return line 31 by way of line 36 and is subsequently returned to the solvent feed tank through line 17.

The precipitate phase in settling vessel 26 is withdrawn through line 27 and transferred into solvent separation zone 28 wherein any neopentane solvent carried through by the precipitate is flashed or distilled off and the residual bituminous fractions are recovered via line 29. Neopentane is withdrawn from zone 28 via line 30 and returned to solvent feed tank 18 by way of lines 31 and 17. Line 31 is provided with heat exchange means 32 to regulate the temperature of neopentane being recycled to the solvent feed tank. Make-up solvent is fed to solvent feed tank 18 via line 15 through pump 16 and line 17 as needed. The temperature range of operation of the above-described process can be from 0 to 250° F. The pressure within the system illustrated is normally maintained at a level at which the neopentane solvent can be maintained substantially in the liquid state. The methods of determining pressures to be used in the process of the present invention are well known to those skilled in the art.

Mixing device 22, settling vessel 26, separation zone 28 and separation zone 35 each can be provided with heat exchange means for added temperature control throughout the process.

By way of illustration the following examples are given to demonstrate other embodiments of the present invention.

Asphalt recovered as residuum from vacuum tower de-asphalting of Venezuelan crude oil was used in the solvent extraction procedures given in the examples below. This asphalt was characterized as follows:

Softening point, ASTM D36–26, ° F. _____ 111
C/H (atomic) _____ 0.68
Sulfur, weight percent _____ 3.09
OD color _____ 1720
Vis. at 210° F. (SUS) _____ 1191
Conradson carbon, weight percent _____ 18.2

*Example 1*

100 grams of asphalt were dispersed with agitation in 500 cc. of neopentane at 20° F. and atmospheric pressure. The solvent-asphalt slurry was contacted for two hours under agitation after which agitation was discontinued and the slurry was permitted to settle. After settling the supernatant liquid of the slurry was decanted and the insoluble precipitate was again reslurried in 500 cc. of neopentane and the process repeated. The supernatant liquid fraction recovered from the first and second contacting steps was combined and the soluble fraction of asphalt contained therein was recovered by distilling off the solvent extraction medium.

The insoluble fraction of the asphalt slurry was recovered from the neopentane solvent in the same manner. The results of this extraction process and a characterization of the asphaltic fractions recovered are presented in Table I in the line indicated for Example 1.

*Example 2*

To illustrate the fact that any grade of neopentane is effective for the purposes of the present invention the present extraction was done in the identical manner as Example 1 except that a technical grade neopentane (95%) was used as the solvent extraction medium.

Example 2 also illustrates the fact that the neopentane solvent medium need not be chemically pure to accomplish the unique bituminous material separation of the present invention.

The soluble fractions of Examples 1 and 2, as characterized in Table 1, are high quality lubricating or crack-ink stock oils which fact illustrates that only the oil fraction of the asphaltic residuum of Examples 1 and 2 is solubilized and extracted using neopentane as the solvent extraction medium. The physical characterizations in Table I of the insoluble fractions of Examples 1 and 2 illustrate that this insoluble fraction of a neopentane fractionation of asphalt is comprised of asphaltenes and resins.

Examples 3 to 6 are given to illustrate the results of fractionating asphalt or similar bituminous materials utilizing well known fractionating solvents at temperatures disclosed for the process of the present invention. It can be easily recognized by comparing the results presented in Table I that presently known solvents which are normally utilized in fractionating asphalts or similar bituminous materials fail to produce the desired separation of oil at the effective temperatures of operation of the present invention. The fact that the type of separation achieved by the process of the present invention is entirely different from the separations which have been heretofore disclosed renders this solvent and the present process unique in this respect.

Examples 3 and 4 are particularly given to specifically illustrate the fact that the separation of bituminous residua accomplished by neopentane extraction is unique to that solvent alone, and it is not possible to accomplish this specific separation under these conditions even with the next nearest chemical homologue.

*Example 3*

The identical procedure using the identical type asphalt as disclosed in Example 1 was followed in this example with the exception that neohexane (2,2-dimethylbutane) was substituted for neopentane as the solvent extraction medium.

*Example 4*

As a further means of comparison this extraction procedure was performed in the same manner as Example 3 except that the process was carried out at 85° F. instead of 20° F.

*Example 5*

The identical procedure using the identical type asphalt as disclosed in Example 1 was followed in the present example with the exception of the substitution of n-pentane for neopentane as the solvent in the extraction.

*Example 6*

As a further means of comparison this extraction procedure was performed in the same manner as Example 5 except that the process was carried out at 85° F. instead of 20° F.

The results of the fractionation of asphalt accomplished by the procedures disclosed in Examples 1 to 6 are presented in Table I. Characterization of the fractions recovered from separation accomplished by each procedure described in the above examples is presented on the line indicated for each individual example.

TABLE I

| Example | Soluble (Fraction) | | | | | | | Insoluble (Fraction) | | | | |
|---|---|---|---|---|---|---|---|---|---|---|---|---|
| | Yield, wt. Percent | Mol.[1] Weight | C/H ratio | Vis.[2] at 210° F. | VI[3] | OD[4] Color | Conradson Carbon | Yield, wt. Percent | ASTM D36-26, R+B Soft. Pt., °F. | Mol.[1] Weight | C/H ratio | Wt. Percent Sol. in Pentane |
| 1 | 44.0 | 842 | 0.59 | 534 | 83 | 32 | 3.4 | 56.0 | 200 | 1,400 | 0.76 | 51.6 |
| 2 | 43.1 | 871 | 0.57 | 535 | 83 | 42 | 4.2 | 56.9 | 190 | 1,437 | 0.77 | |
| 3 | 65.5 | 944 | 0.61 | 1,652 | | 384 | | 34.5 | 275 | 1,772 | 0.79 | 30.9 |
| 4 | 66.9 | 927 | 0.62 | 1,856 | | 439 | | 33.1 | 275 | 1,757 | 0.80 | 33.2 |
| 5 | 68.6 | 933 | 0.64 | 1,784 | | 426 | 11.6 | 31.4 | 265 | 1,771 | 0.81 | 34.5 |
| 6 | 77.2 | 924 | 0.65 | | | 422 | | 22.8 | 319 | 2,395 | 0.93 | 21.7 |

[1] Molecular weight procedure as described by A. P. Brady, H. Huff, J. W. McBain, J. Physical & Colloidal Chem., 55, 304 (1951).
[2] Furol Saybolt Viscosity at 210° F., ASTM D88-56.
[3] Viscosity Index.
[4] Optical Density as measured in a benzene solution; $\log_{10} I/T \times$ dilution factor = OD Color.

*Example 7*

To further substantiate the fact that resin fractions as well as the asphaltene fractions of bituminous residua are substantially insoluble in the neopentane solvent medium, the insoluble fraction of the neopentane separation of asphalt disclosed in Example 1 above was subsequently extracted with n-pentane in the same manner as disclosed in Example 6. A pentane-soluble and a pentane-insoluble fraction were each recovered by this procedure. The results of this subsequent pentane fractionation of the neopentane insoluble fraction of Example 1 is given below in Table II along with the results of Examples 1 and 5 previously disclosed in Table I. A comparison of these results verifies further the fact that only the oil fraction is extracted from asphalt or similar bituminous residua when neopentane is used as the solvent.

Any other desired method may be employed which will effect the separation of the undissolved material from the solution of oil and neopentane.

The recovery of oil from asphaltic or similar bituminous material can be accomplished after the bituminous material has first been treated with other paraffinic solvents. For example, an asphalt residuum can first be separated into an asphaltene fraction and a resin-oil fraction by conventional means using known low boiling paraffinic solvents such as normal pentane or isopentane. The solvent-soluble fraction containing oil and resins can then be extracted with neopentane to separate and recover the soluble oil from the resins which precipitate in neopentane. In another procedure the bituminous material is first contacted with neopentane to extract the oil fraction. The residue from the first extraction is then extracted with other known low-boiling paraffinic solvents to separate the

TABLE II

| | Example 1—Neopentane at 20° F. | | Example 7—n-Pentane Extraction of Neopentane-pp'd. Asphaltenes + Resins, 82° | | Example 5—n-Pentane at 20° F. | |
|---|---|---|---|---|---|---|
| | Oil | Asphaltenes + Resin | Resin | Asphaltene | Maltenes | Asphaltenes |
| Yield, wt. percent of Stock | 44.0 | 56.0 | 29.7 | 26.4 | 68.6 | 31.4 |
| R+B Soft. Pt., ° F., ASTM D36-26 | | 200 | 150 | 360 | | 265 |
| OD Color[1] | 32 | | 728 | | 426 | |
| Vis. at 210° F. (SUS), ASTM D88-56 | 534 | | | | 1,856 | |
| Viscosity Index | 84 | | | | | |
| Viscosity Gravity Constant | 0.851 | | | | 0.922 | |
| Conradson Carbon, wt. percent | 3.4 | | | | 11.6 | |

[1] Optical Density as measured in benzene solution; OD Color = $\log_{10} I/T \times$ dilution factor.

This unique property of neopentane to selectively extract the oil fraction of bituminous residua at low temperatures and pressures without extracting the resin fraction is a property not known to any of the other low boiling paraffinic solvents presently used. This selective solvency of neopentane for oil appears to be attributable to the unique three-dimensional symmetry of the peopentane molecule.

In the process of the present invention, the neopentane solvent and asphalt or similar bituminous material are thoroughly mixed. The mixture is then permitted to settle whereby the asphaltene resins and waxes precipitate leaving only oil and solvent in the supernatant liquid. The neopentane solvent and bituminous material mixture may be allowed to stand until any undissolved material has settled, after which the supernatant solution may be drawn off. The subsequent removal of the neopentane solvent from the recovered supernatant liquid provides for the recovery of a high quality asphaltene-free, resin-free oil. Similarly, the mixture may be fed to a continuous settling device which permits the continuous removal of undissolved material and the continuous withdrawal of the supernatant solution. Alternatively, the undissolved material may be separated from the solution by filtration. Still another method of carrying out a separation is to centrifuge the undissolved material from the mixture.

resin and asphaltene fractions. Thus a complete separation of asphaltic or similar bituminous residuum into its three component fractions can be accomplished by the methods of the present invention.

One advantage of the process of the present invention heretofore pointed out is the fact that the oil fraction separated by neopentane extraction as herein disclosed is substantially wax-free. This fact is of particular value when the bituminous residuum being processed originated from a wax-bearing petroleum crude oil, since wax is often an undesirable impurity in oil used for many applications.

The process of the present invention can be operated at subatmospheric as well as superatmospheric pressures, preferably at temperatures and pressures at which the neopentane can be most easily maintained in a predominately liquid state. It has been discovered that the process of the present invention is operable within the temperature range of 0–250° F. in an autoclave with corresponding pressures which provide for maintaining the neopentane solvent predominately in a liquid phase. The preferable temperature range for the process of the present invention is 0–100° F.

The bituminous materials suitable for use in this invention include pyrogenous and native bitumens. The pyrogenous bitumens include reduced crudes of either steam or vacuum reduced type, shale oils or tars, cracked tars, etc. The native bitumens include gilsonite, grahamite, wurtzilite, native asphalt (Trinidad), etc.

The invention claimed is:

1. Process for recovering oil from an oil-bearing bituminous material containing bituminous resins and oil which comprises intimately contacting said bituminous material with liquid neopentane at a temperature within the range of 0 to 250° F., separating the resulting mixture into a first fraction comprising bituminous oil dissolved in neopentane and a second fraction comprising undissolved bituminous material including said resins and recovering the oil from the first fraction.

2. Process according to claim 1 wherein the temperature is within the range of 0–100° F.

3. Process according to claim 1 wherein said bituminous material is asphalt.

4. Process according to claim 3 wherein the temperature is within the range of 0–100° F.

5. Process according to claim 1 wherein said bituminous material comprises a mixture of bituminous resins and oil previously obtained by extracting an oil-bearing bituminous material with a low boiling paraffinic hydrocarbon solvent other than neopentane.

6. Process according to claim 5 wherein the temperature is within the range of 0–100° F.

7. Process of recovering substantially asphaltene-free, resin-free, wax free oil from a bituminous material containing asphaltenes, resins, waxes and oil which comprises intimately contacting said bituminous material with liquid neopentane at a temperature within the range of 0 to 250° F., separating the resulting mixture into a first fraction comprising oil dissolved in neopentane and a second fraction comprising asphaltenes, resins and waxes and recovering a substantially asphaltene-free, resin-free, wax-free oil from said first fraction.

8. Process according to claim 7 wherein the temperature is within the range of 0–100° F.

9. In a process for fractionating a bituminous material containing asphaltenes, resins, and oil in which said material is first separated into a heavy fraction consisting essentially of asphaltenes and a light fraction consisting essentially of resins and oil, the improvement comprising contacting said light fraction with liquid neopentane and recovering a liquid fraction from said light fraction essentially comprising neopentane and asphaltene-free, resin-free oil.

10. Process according to claim 9 wherein said bituminous material is asphalt.

References Cited

UNITED STATES PATENTS

| | | | |
|---|---|---|---|
| 2,729,589 | 1/1956 | Waghorne et al. | 208—309 |
| 2,850,431 | 9/1958 | Smith | 208—309 |
| 2,940,920 | 6/1960 | Garwin | 208—309 |

DELBERT E. GANTZ, *Primary Examiner.*

H. LEVINE, *Assistant Examiner.*